M. T. Hitchcock,

Car Ventilator.

No. 4,005. Reissued May 31. 1870.

Witnesses;
W. C. Aslikettler
J. A. Fraser

Inventor;
M. T. Hitchcock
per Munn & Co
Attorneys

N. PETERS, PHOTO-LITHOGRAPHER, WASHINGTON, D. C.

UNITED STATES PATENT OFFICE.

M. T. HITCHCOCK, OF SPRINGFIELD, MASSACHUSETTS, ASSIGNOR TO JOHN W. LABAREE.

CAR-VENTILATOR.

Specification forming part of Letters Patent No. 74,534, dated February 18, 1868; Reissue No. 4,005, dated May 31, 1870.

*To all whom it may concern:*

Be it known that I, M. T. HITCHCOCK, of Springfield, in the county of Hampden and State of Massachusetts, have invented a new and useful Improvement in Car-Ventilators; and I do hereby declare that the following is a full, clear, and exact description thereof, reference being had to the accompanying drawings, making a part of this specification, and to the letters of reference marked thereon, in which—

Figure 1:
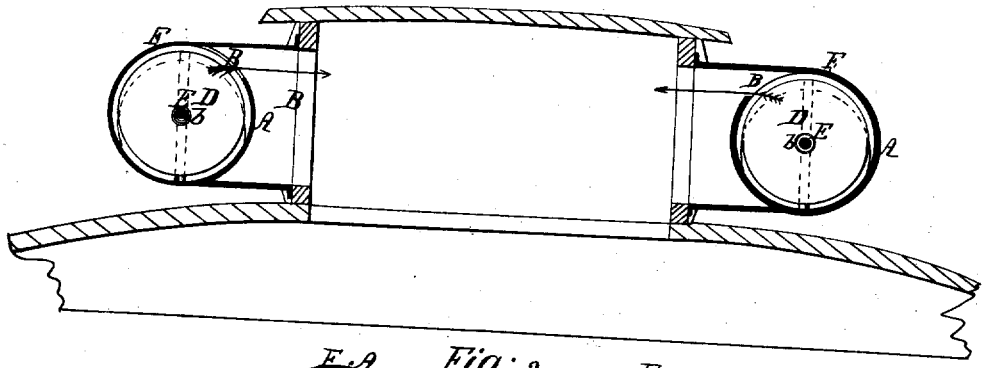
Figure 2:
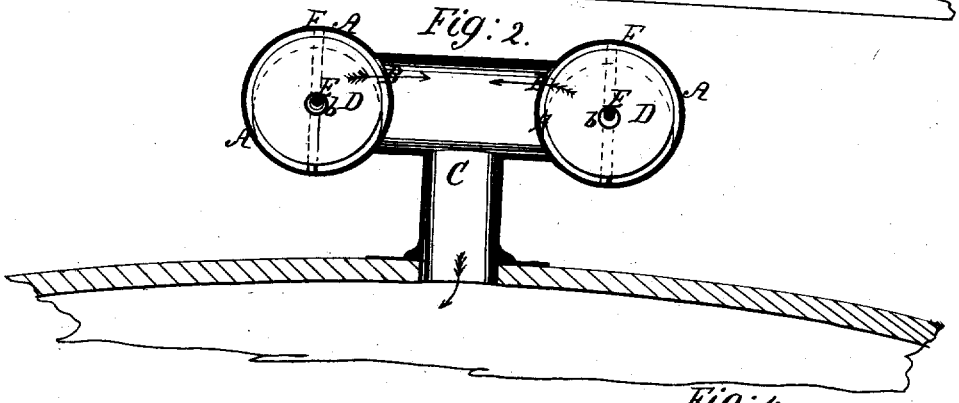
Figure 3:
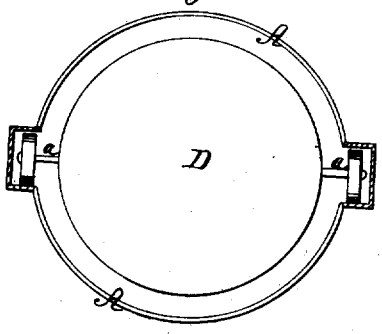
Figure 4:
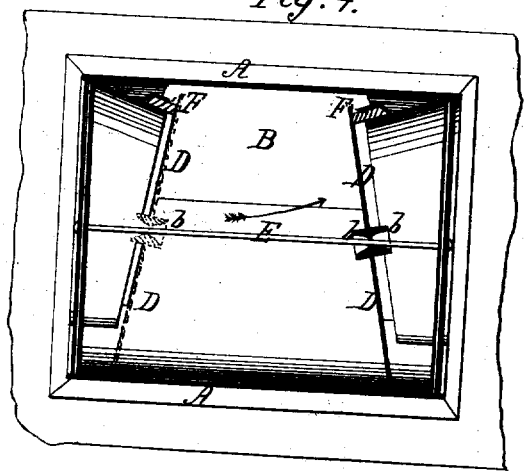

Figure 1 represents a vertical transverse section of my improved car-ventilator as attached to a car. Fig. 2 is a similar view representing a modification of the same. Fig. 3 is a similar view representing another modification. Fig. 4 is a vertical longitudinal section of the same.

This invention relates to a new car-ventilator; and it consists of a shell or case a portion or one side of which is cylindrical, the other side having an opening therein, being attached or secured to the car in any convenient manner, and within which shell or case is a sliding valve which is moved to and fro in said shell or case by the wind, according to the direction in which the car may be moving.

The abutments at the ends of the case or shell, against which the valve strikes, are made of elastic material in order to deaden the noise when the valve strikes said abutment. The valve is hung so that it can slide on its bearings, and that it can also oscillate on its bearings, for the purpose of allowing the valve to assume an inclined position when reaching the end of the case, which position is produced by the shape of the abutment, which is so shaped that the upper end of the valve is nearer to the front than the lower end, so that solid bodies—such as cinders, dust, or sparks—may, by the position of the valve, be caused to slide down on the same to the bottom of the case.

Between the lower edge of the valve and the bottom of the case is left an open space for the purpose of discharging solid bodies blown into the shell, and also the surplus wind. The fresh air is conducted into the car by a suitable channel or passage through the side of the shell or case. The ventilator may be conveniently attached to the roofs of all kinds of cars and will be automatic in its operation, as it will readily adjust itself to the motion of the car in whichever direction the car may move.

That others skilled in the art may be able to make and use my invention, I will proceed to describe its construction and the mode of its operation.

In the drawings, A represents the case or shell of my improved ventilator, which may be cylindrical, or partially so, or prismatic or any other suitable shape—that is to say, its general cylindrical form or the form of that portion of the shell which is cylindrical may be given to it by making such portion circular, polygonal, or oval in its cross-section. That side of the shell or case A which is attached to the car may be made rectangular, giving the channel B for the passage of the air a rectangular form, or it may be made of any other suitable and desirable form to suit the construction of the car, while that portion of the shell A which is opposite the channel B is made cylindrical or polygonal, as hereinbefore explained. I prefer to make it cylindrical, as that form of that portion of the shell is the best adapted to the successful operation of the ventilator, and an opening at each end, and said shell A may be made of any suitable and desirable material, tin being well adapted to that purpose. It is evident that the sides of the channel B may be parallel, or nearly so, and said channel B may be large or small, of any desirable size.

On cars in which a deck is formed above the roof, as in Fig. 1, the ventilator can be easily attached to the edges of the deck, as shown in Fig. 1; but where no such deck is provided, as in Fig. 2, the ventilators are attached on opposite sides, if desired, to an upright tube, C, projecting from the roof and connecting the channels B with the interior of the car, as is clearly indicated in Fig. 2.

Within the shell A is arranged a sliding valve, D, which is either hung upon a rod, E, that passes longitudinally through the case, as in Figs. 1, 2, and 4, or said valve is provided with trunnions *a a*, that are fitted into grooves on the sides of the shell, said trunnions carrying friction-rollers operating in said grooves, as in Fig. 3. If the valve is hung on the rod E, it is provided with a hub, *d*, the bore of which is narrowest in the middle and flaring toward each end, as in Fig. 4. The object of this hub is to allow the valve to assume a certain inclined position at each end of the case, as in Fig. 4. If the valve is hung at both ends, as in Fig. 3, it will oscillate easily upon its pivots. At each end of the case A is arranged within the upper part of the same an abutment, F, which is lined with india-rubber or other suitable elastic material, and which is so formed as to cause the valve D, when blown against the abutment by the wind, to assume an inclined position, with its lower part nearest the outer end of the case, as in Fig. 4. The lower part of the valve D does not reach the bottom of the case A, so that a space is left there, as shown.

The operation is as follows: In whatever direction the car moves the wind entering the front end of the shell A will drive the valve toward the rear end of the same against the abutment provided therein. Owing to the inclined position of the valve all solid bodies thrown against it by the force of the draft will fall to the bottom of the case and will be blown out through the space left between the same and the lower edge of the valve. The pure air will enter the car through the channel B. If the motion of the car is reversed, the valve will at once reverse its position in the shell A and also its inclined position, as indicated in Fig. 4, the valve being always in the rear end of the shell A when the car is in motion.

This ventilator possesses numerous superior advantages over those now in use. The most important of these advantages are the following: It separates the pure air from the impure substances contained therein, and causes only the pure air to enter the car; it is automatic, and adjusts itself at once to the motion of the car; it is noiseless, and is simple in its construction, can be cheaply made, and cannot easily get out of order, as those which are provided with hinged valves can.

I am aware that ventilators having a cylindrical shell have heretofore been made, but differing very materially both in construction and operation from that herein described, as shown in Letters Patent No. 36,044, granted to William Westlake, for car-heater, and also in Letters Patent No. 36,063, granted to same party for car-ventilator, both dated July 29, 1862; and I therefore disclaim any and every part of said devices and every other cylindrical ventilator device without the quadrangular or prismatic attachment part B, as that constitutes a particular feature of my invention in adapting the shell to the side of a "monitor" or other car; and, Having therefore described my invention, what I claim as new, and desire to secure by Letters Patent, is—

1. The hub *b* of the sliding valve, constructed as described, so that both a sliding and an oscillating motion can be imparted to the valve, as set forth.

2. Providing the case or shell A, in which the sliding valve D moves, with abutments F F, which are so arranged that the valve, when striking against one of the abutments, will be brought into an inclined position, substantially as and for the purpose herein set forth and specified.

3. The shell or case A, when provided with the abutments F F, in combination with the sliding oscillating valve D and with the channel B, all made so that the lower edge of the valve does not come in contact with the bottom of the shell, and all operating substantially in the manner herein shown and described.

4. The combination of a cylindrical or partially - cylindrical shell or case, A, with a quadrangular or prismatic side attachment portion, B, constructed substantially as herein described.

M. T. HITCHCOCK.

Witnesses:
T. A. CURTIS,
HENRY T. MILLER.